United States Patent
Wu et al.

(10) Patent No.: US 8,194,639 B2
(45) Date of Patent: Jun. 5, 2012

(54) METHOD AND APPARATUS FOR PROVIDING AUTOMATED PROCESSING OF A MULTICAST SERVICE ALARM

(75) Inventors: Teh-Hsin K. Wu, Holmdel, NJ (US);
Paritosh Bajpay, Edison, NJ (US);
Jackson Liu, Middletown, NJ (US);
Zhenzhen Wang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 425 days.

(21) Appl. No.: 12/325,520

(22) Filed: Dec. 1, 2008

(65) Prior Publication Data
US 2010/0135161 A1 Jun. 3, 2010

(51) Int. Cl.
*H04L 12/28* (2006.01)
(52) U.S. Cl. ........................................ 370/351
(58) Field of Classification Search .................. 370/351, 370/389, 390–392; 709/223, 227, 230–232; 714/25, 37
See application file for complete search history.

(56) References Cited

U.S. PATENT DOCUMENTS

| 7,389,359 | B2 * | 6/2008 | Jain et al. ................... 709/238 |
| 7,447,225 | B2 * | 11/2008 | Windisch et al. ............ 370/428 |
| 7,454,484 | B1 * | 11/2008 | He ................................. 709/223 |
| 2007/0189193 | A1 * | 8/2007 | Previdi et al. ................ 370/256 |
| 2008/0298360 | A1 * | 12/2008 | Wijnands et al. ............ 370/389 |
| 2009/0161670 | A1 * | 6/2009 | Shepherd et al. ............ 370/389 |
| 2010/0107001 | A1 * | 4/2010 | Asati et al. ...................... 714/4 |

* cited by examiner

*Primary Examiner* — Dmitry H Levitan

(57) ABSTRACT

A method and apparatus for providing automatic processing of an alarm related to a multicast service in a network are disclosed. For example, the method receives an alarm related to a multicast service, and retrieves multicast data, wherein said multicast data comprises one or more of: a source Internet Protocol (IP) address for a source, a group IP address, and Protocol Independent Multicast (PIM) data. The method retrieves interface information, wherein the interface information comprises one or more of: an interface IP address, a PIM mode, and a Designated Router (DR) IP address. The method retrieves a status of a neighbor of the source in accordance with the source IP address, and determines if a neighbor is established for the source IP address.

20 Claims, 5 Drawing Sheets

300

METHOD AND APPARATUS FOR PROVIDING AUTOMATED PROCESSING OF A MULTICAST SERVICE ALARM

The present invention relates generally to communication networks and, more particularly, to a method and apparatus for providing automated processing of multicast service alarms in a packet network, e.g., an Internet Protocol (IP) network.

BACKGROUND OF THE INVENTION

A customer may subscribe to a multicast service, e.g., television or video broadcast service, distributed over an Internet Protocol (IP) based network. The multicast service may be provided using a protocol optimized for a one-to-many distribution mode, e.g., Protocol Independent Multicast-Source Specific Mode (PIM-SSM). One-to-many distribution mode refers to a distribution mode in which one source distributes data to many receivers simultaneously. PIM-SSM is suitable for distributing Internet Protocol Television (IPTV) or video signals to users quickly and efficiently.

When a PIM-SSM failure or degradation occurs, it may be detected by the network service provider or reported by a customer to the network service provider. For example, if a customer detects a failure on his/her multicast service, the customer may report the failure to the network service provider. The network service provider may then dispatch maintenance personnel to perform trouble isolation and repair. However, in a large network, the cost of dispatching personnel for each detected and/or reported problem is cost prohibitive. In addition, the customer may be receiving a degraded service or no service at all while alarms are being generated. The degraded service and the delay in performing maintenance affect customer satisfaction.

SUMMARY OF THE INVENTION

In one embodiment, the present invention discloses a method and apparatus for providing automatic processing of an alarm related to a multicast service in a network. For example, the method receives an alarm related to a multicast service, and retrieves multicast data, wherein said multicast data comprises one or more of: a source Internet Protocol (IP) address for a source, a group IP address, and Protocol Independent Multicast (PIM) data. The method retrieves interface information, wherein the interface information comprises one or more of: an interface IP address, a PIM mode, and a Designated Router (DR) IP address. The method retrieves a status of a neighbor of the source in accordance with the source IP address, and determines if a neighbor is established for the source IP address.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
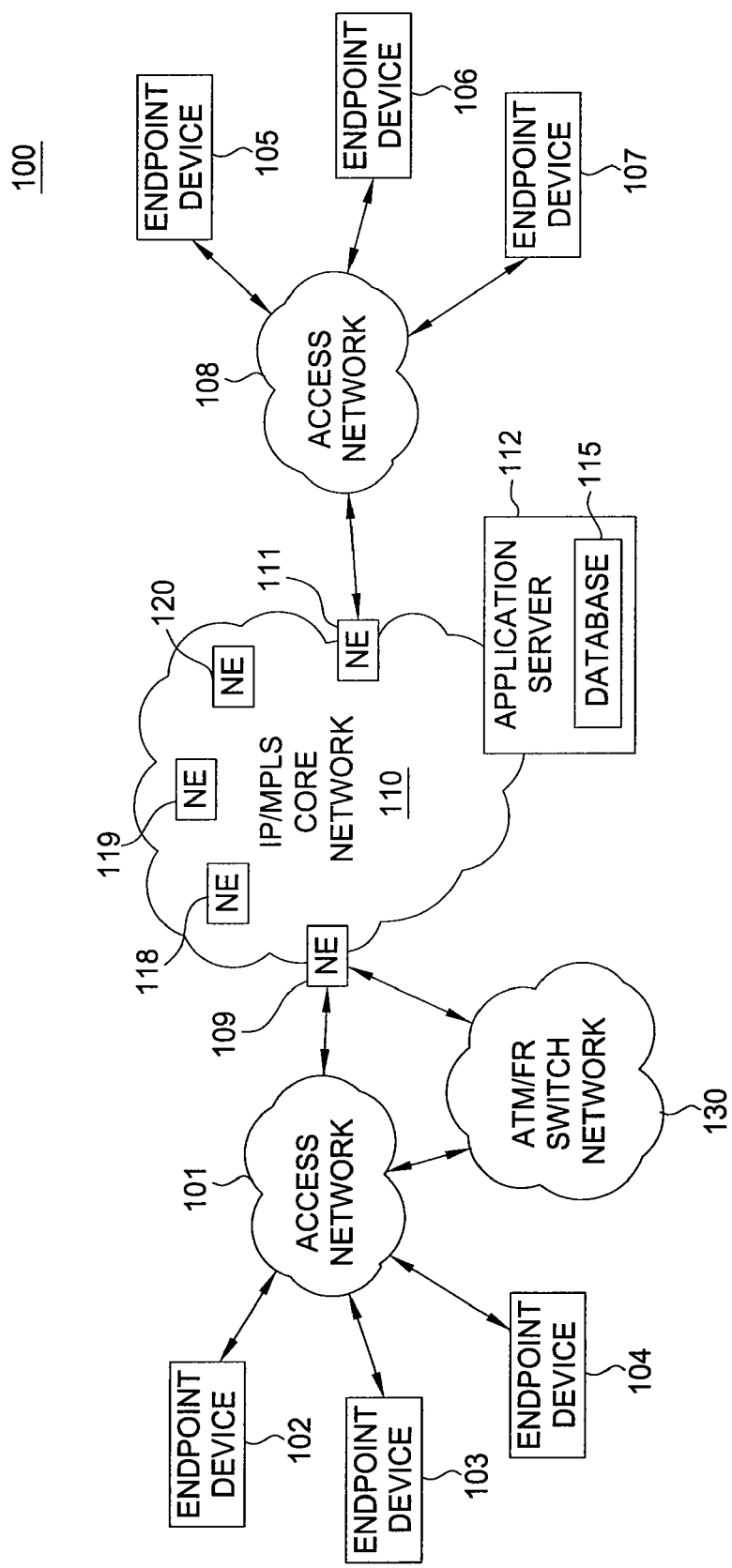
FIG. 1 illustrates an illustrative network related to the present invention.

The present invention broadly discloses a method and apparatus for providing automated processing of a multicast alarm in a network. FIG. 1 is a block diagram depicting an illustrative network 100 related to the current invention. Exemplary networks include Internet protocol (IP) networks, Asynchronous Transfer Mode (ATM) networks, frame-relay networks, and the like. ATM, frame-relay and IP networks are packet based networks. An IP network is broadly defined as a network that uses Internet Protocol such as IPv4 or IPv6 and the like, to exchange data packets.

In one embodiment, the network 100 may comprise a plurality of endpoint devices 102-104 configured for communication with the core packet network 110 (e.g., an IP based core backbone network supported by a service provider). The endpoint devices 102-104 may communicate with the IP/MPLS core network 110 via an access network 101. Similarly, a plurality of endpoint devices 105-107 are configured for communication with the core packet network 110 via an access network 108. The network elements 109 and 111 may serve as gateway servers or edge routers for the IP/MPLS core network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111. The access networks 101 and 108 may each comprise a Digital Subscriber Line (DSL) network, a broadband cable access network, a Local Area Network (LAN), a Wireless Access Network (WAN), a $3^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge (PE) Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication network 100 may be expanded by including additional endpoint devices, access networks, border elements, application servers, 3$^{rd}$ party networks, etc. without altering the scope of the present invention.

The above IP network is described to provide an illustrative environment in which packets for voice services, data services, and/or video, services are transmitted on switched and/or IP networks. For example, a customer may subscribe to a multicast service, e.g., IPTV service, video service, etc. When a service failure or degradation occurs, it may be detected by the network service provider or reported by a customer to the network service provider. For example, a customer may detect a failure on his/her multicast service via an endpoint device and report the failure to the network service provider. The customer may interact with an Interactive Voice Response (IVR) system and report an outage/degradation for a multicast service.

Figure 2:
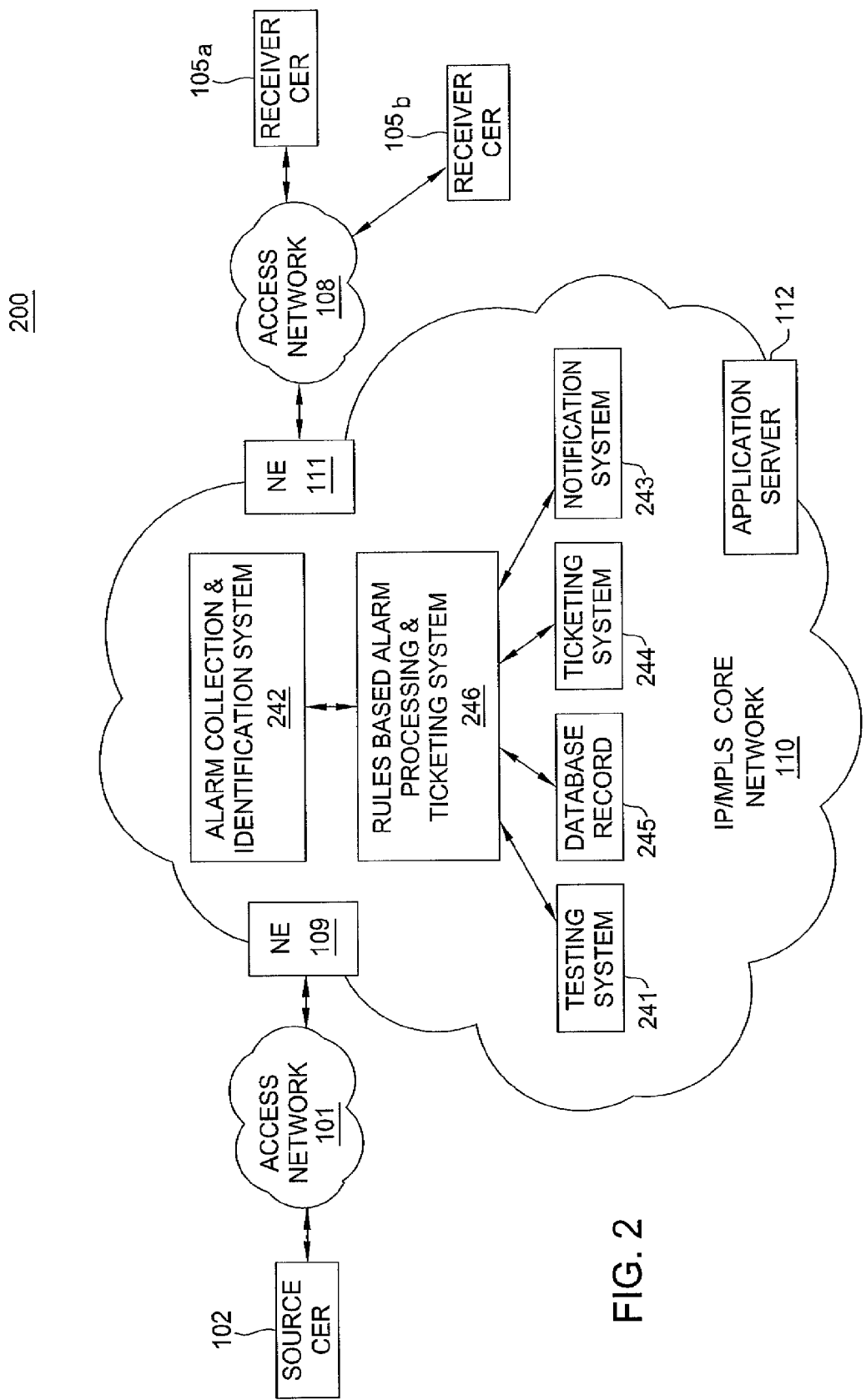
FIG. 2 illustrates an illustrative network with automated processing of a multicast alarm.

In one embodiment, the present invention discloses a method and apparatus for providing automatic processing of multicast service alarms on a network. FIG. 2 illustrates an illustrative network 200 with automated processing of a multicast service alarm. For example, a Customer Edge Router (CER) 102 is communicating with an IP/MPLS core network 110 via an access network 101. Similarly, CERs 105a and 105b are communicating with the IP/MPLS core network 110 via an access network 108.

In one embodiment, the IP/MPLS core network 110 comprises an application server 112, border elements 109 and 111, a testing system 241, an alarm collection and identification system 242, a notification system 243, a ticket generation system 244, a database of record 245, and a rule based alarm processing and ticketing system 246.

In one embodiment, network elements 109 and 111 may be border elements that function as PE routers for the IP/MPLS core network 110. The rule based alarm processing and ticketing system 246 is connected to the various systems 241-245 for automating the processing of network alarms. In one embodiment, the application server 112 enables customers to subscribe to services with automated processing of network alarms.

In one embodiment, the testing system 241 is used for sending test packets and receiving responses. For example, the testing system may send "ping" signal to ports on routers, get snapshots of various counters in routers, and so on. The ticket generation system 244 is accessible by customers and service provider personnel. For example, a customer or work center personnel may interact with an Interactive Voice Response (IVR) system and generate a ticket. The ticket may also be created from automatically detected alarms by the alarm collection and identification system 242. The alarm collection and identification system 242 is connected to network elements 109 and 111 that may be PE routers. Similarly, the notification system 243 may be used to provide a notification to a customer, or one or more work centers.

In operation, the CER 102 may multicast data to CERs 105a and 105b via the IP/MPLS core network 110. For example, the users of CERs 105a and 105b may have previously subscribed to receive multicast data, e.g., video data, from the service provider. In turn, the service provider may be receiving the video from a broadcast source, e.g., CER 102 being used as a video source.

In one embodiment, the current method performs automatic processing of multicast service alarms in the rule based alarm processing and ticketing system 246. For example, the rule based alarm processing and ticketing system 246 performs troubleshooting to locate and report one or more root causes when trouble is detected on a multicast service.

In another embodiment, the rule based alarm processing and ticketing system 246 also provides a tool that performs test simulations that mimic network configurations and router responses. For example, a test simulator tool that mimics PIM-SSM problems and their corresponding router responses may be provided. In one embodiment, a PIM-SSM test simulator may create a rule debugging software as a test script using xml files. The test simulator may then use inputs and responses from an inventory system and live routers. The tool may then fine-tune the troubleshooting method by manipulating the various inputs and responses.

In one embodiment, the PIM-SSM test simulator tool may comprise one or more computers to mimic a network deployment. The functionalities of a PIM-SSM test simulator tool may comprise: providing traffic generation, sending data to group addresses, supporting multiple (traffic generation source, group address) joins for each participating source, providing a network that enables SSM session announcements, and providing a data Multicast Distribution Tree (MDT). Those skilled in the art would realize that one or more functionalities of the test simulator tool may be implemented in any number of servers. The test may then be generated and multicast to various receivers that are members of a multicast group address using the data MDT.

For example, a PIM-SSM test simulator tool may provide a main.xml file that contains responses to tests. The responses may be specific to a particular service or interface. The test simulator may then store a library of xml files. The library of xml files can be reusable for various services or features. For a specific feature or service, e.g., a PIM-SSM multicast service, the main.xml file may point to various ports that are capable of connecting to a live test equipment or to an inventory system. A multicast distribution tree may then be established. If a customer address is a member of a multicast group, the customer's address is reachable via the multicast distribution tree. The test simulator tool may then be used to evaluate automation rules, analyze different scenarios of PIM-SSM behavior in production, capture best rules for troubleshooting PIM-SSM problems, and so on.

In one embodiment, the current method then uses the rules for troubleshooting PIM-SSM problems and reports the results to the ticketing and notification systems. For example, a customer may report trouble, e.g., a degradation or a failure of a multicast service, to a multicast service provider via an IVR system. The report/alarm may be forwarded to the service provider's rule based alarm processing and ticketing system 246.

In one embodiment, the rule based alarm processing and ticketing system 246 may then query the database of record 245 to retrieve multicast data, e.g., Protocol Independent Multicast (PIM) data. For example, the method may retrieve the source IP address, group IP address and PIM mode such as SSM (source specific mode).

In one embodiment, the method then retrieves the pertinent interface information. For example, the method may retrieve an interface IP address, a PIM mode, and a Designated Router (DR) IP address. The retrieval of interface information may be performed by running a command such as Show IP PIM interface.

In one embodiment, the method then retrieves the status of the neighbor of the source IP address. For example, the method may run a Show IP PIM neighbor command to retrieve PE-to-CE neighbor status on the source IP address. If the neighbor is not established, the method may then perform Layer 1 and Layer 2 tests. Layer 1 and Layer 2 tests may already exist for the network and the method may use an existing process. If the neighbor is established but the mode is either not present or is not equal to SSM, the method reports the configuration problem to a work center.

In one embodiment, if the neighbor is established and the PIM mode is configured correctly, the method retrieves the multicast routing tables and the status for source, incoming and outgoing IP addresses and Reverse Path Forwarding (RPF) tables. An RPF is a forwarding table used by routers for providing loop free forwarding of multicast packets in multicast routing.

In one embodiment, the method may then determine if an RPF configuration problem exists. If an RPF configuration problem is detected, the method reports the configuration problem to a work center. Otherwise, the method retrieves group address and receiver IP addresses. For example, the method may run a Show IP IGMP (Internet Group Management Protocol) Groups command with the Group's IP address. The command may then return a PE address along with the source and receiver addresses.

In one embodiment, the method may then check if there are any customer premises equipment (CPE) or network problems. For example, the method may check the connectivity between the local PE and the source IP address, the connectivity between the local PE and the receiver IP address, and the connectivity between the remote PE and the receiver IP address.

For example, the method may send a ping request from the local PE to the source IP address. If a trouble is detected, then the method reports the CPE problem for the source IP address. Otherwise, the method may send a ping request from the local PE to the receiver IP address. If no trouble is detected, the method reports that no problem is found. If a trouble is detected, the method may send a ping from the remote PE to the receiver IP address. If trouble is detected (e.g., no response) for the ping from the remote PE to the receiver, the method reports a CPE problem for the receiver IP address. Otherwise, the problem is isolated as being located in the network between the local and remote PEs. The method then reports a network problem.

Figure 3:
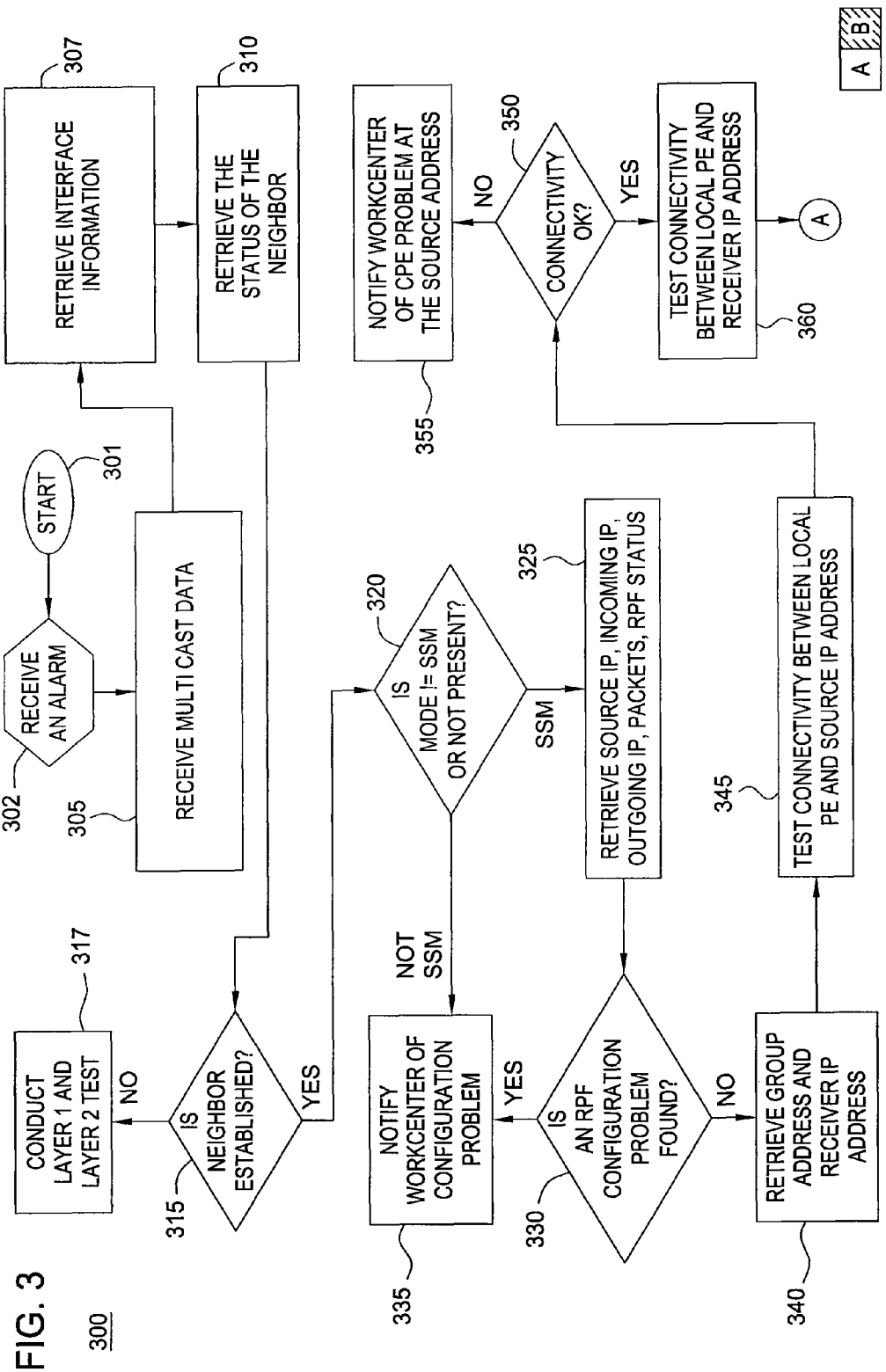
FIG. 3 illustrates a flowchart of a method for providing automated processing of a multicast alarm.
Figure 3:
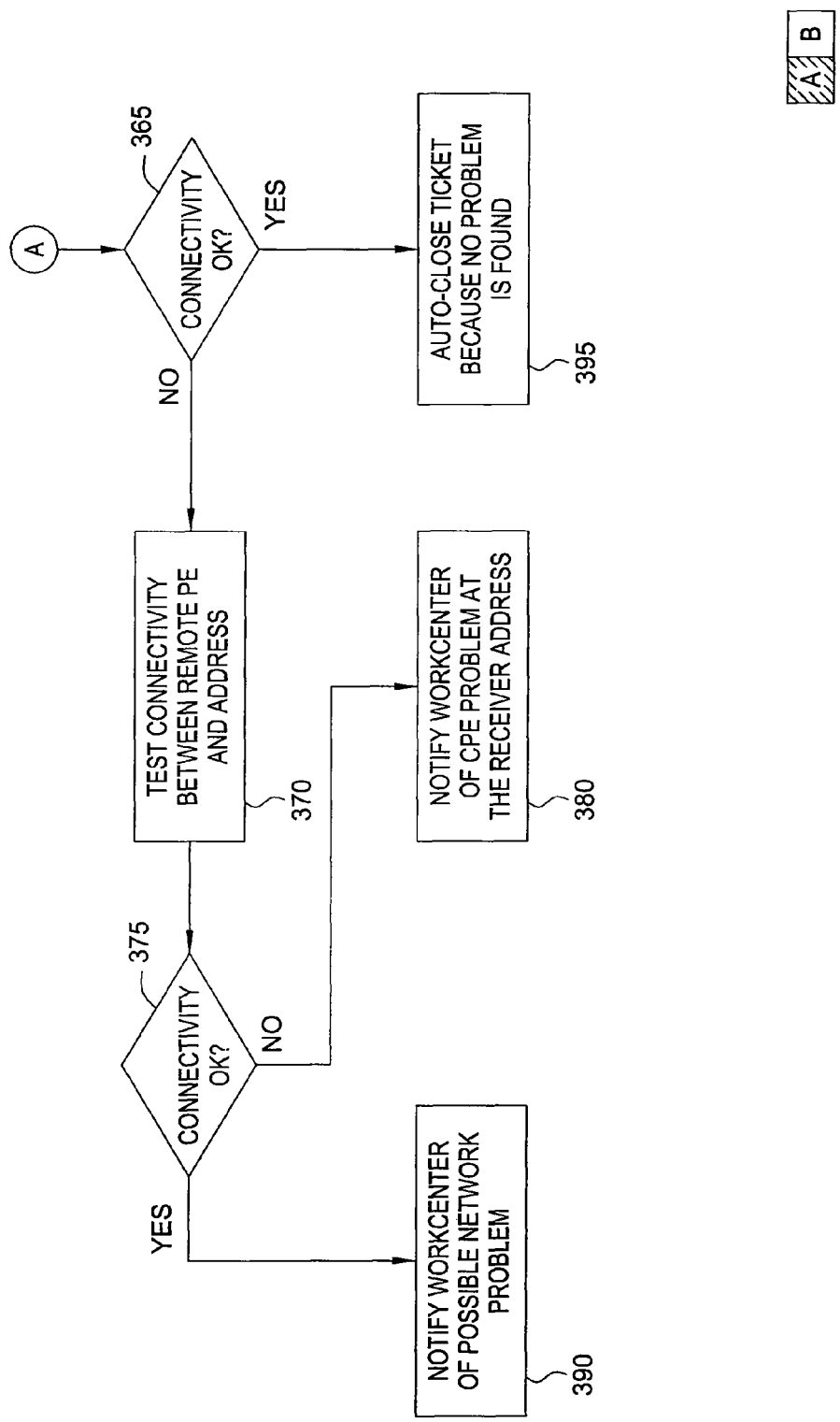

FIG. 3 illustrates a flowchart of a method 300 for providing automatic processing of a multicast alarm. For example, one or more steps of method 300 can be implemented by a rule based alarm processing and ticketing system. Method 300 starts in step 301 and proceeds to step 302.

In step 302, method 300 receives an alarm related to a multicast service. For example, a rule based alarm processing and ticketing system receives an alarm for a failure or a degradation of a multicast service associated with a customer.

In step 305, method 300 retrieves multicast data, e.g., Protocol Independent Multicast (PIM) data, from an inventory system. For example, the method may retrieve one or more of: the source IP address, group IP address and PIM mode such as SSM (source specific mode).

In step 307, method 300 retrieves interface information. For example, the method may retrieve interface IP address, PIM mode, and Designated Router (DR) IP address. For example, the method may run a command such as Show IP PIM interface.

In step 310, method 300 retrieves a status of the neighbor of the source in accordance with the retrieved source IP address. For example, the method may run a Show IP PIM neighbor command to retrieve PE-to-CE neighbor status on the source IP address.

In step 315, method 300 determines if the neighbor is established. If the neighbor is established, the method proceeds to step 320. Otherwise, the method proceeds to step 317.

In step 317, method 300 performs Layer 1 and Layer 2 tests that are designed to test whether there are errors (e.g., pertaining to connectivity, configuration, and the like) associated with Layer 1 and Layer 2 of the network. Layer 1 and Layer 2 tests may already exist for the network and the method may use an existing process to conduct the Layer 1 and Layer 2 tests. The method may then return to step 302 to continue receiving alarms.

In step 320, method 300 determines if the multicast mode is SSM. If the mode is SSM, then the method proceeds to step 325. Otherwise, the method proceeds to step 335. For example, if the mode is not present or is not equal to SSM, the method proceeds to step 335 to report a PIM-SSM configuration problem.

In step 325, method 300 retrieves the multicast routing tables and the status for source, incoming and outgoing IP addresses and Reverse Path Forwarding (RPF) tables. The method then proceeds to step 330.

In step 330, method 300 determines if an RPF configuration problem exists. If an RPF configuration problem is detected, the method proceeds to step 335 to report the configuration problem to a work center. Otherwise, the method proceeds to step 340.

In step 335, method 300 reports a configuration problem to a work center. For example, if a multicast mode configuration problem is detected in step 320, the configuration problem is reported to the work center. The method then proceeds to step 302 to continue receiving alarms.

In step 340, method 300 retrieves the group address and receiver IP addresses. For example, the method may run a Show IP IGMP (Internet Group Management Protocol) Groups command with the Group's IP address. The Show IP IGMP command may then return a PE address along with the source and receiver addresses.

In step 345, method 300 tests the connectivity between the local PE and the source IP address. For example, the method may send a ping request from the local PE to the source IP address.

In step 350, method 300 determines if the connectivity test between the local PE and the source IP address passed. If the connectivity test passed, the method proceeds to step 360. Otherwise, method 300 proceeds to step 355.

In step 355, method 300 notifies a work center of the CPE problem for the source IP address. The method then proceeds to step 302 to continue receiving alarms.

In step 360, method 300 tests the connectivity between the local PE and the receiver IP address. For example, the method may send a ping request from the local PE to the receiver.

In step 365, method 300 determines if the connectivity test between the local PE and the receiver passed. If the connectivity test passed, the method proceeds to step 395. Otherwise, method 300 proceeds to step 370.

In step 370, method 300 tests the connectivity between the remote PE and the receiver IP address. For example, the method may send a ping request from the remote PE to the receiver.

In step 375, method 300 determines if the connectivity test between the remote PE and the receiver passed. If the connectivity test passed, the method proceeds to step 390. Otherwise, method 300 proceeds to step 380.

In step 380, method 300 notifies a work center of a CPE problem for the receiver address. The method then proceeds to step 302 to continue receiving alarms.

In step 390, method notifies the work center of a possible problem in the service provider's network. The trouble is isolated as being between the local and remote PEs. A work center personnel may then initiate remedy steps. The method then proceeds to step 302 to continue receiving alarms.

In step 395, method 300 reports that no trouble is detected. The method then closes the current ticket and proceeds to step 302 to continue receiving alarms.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
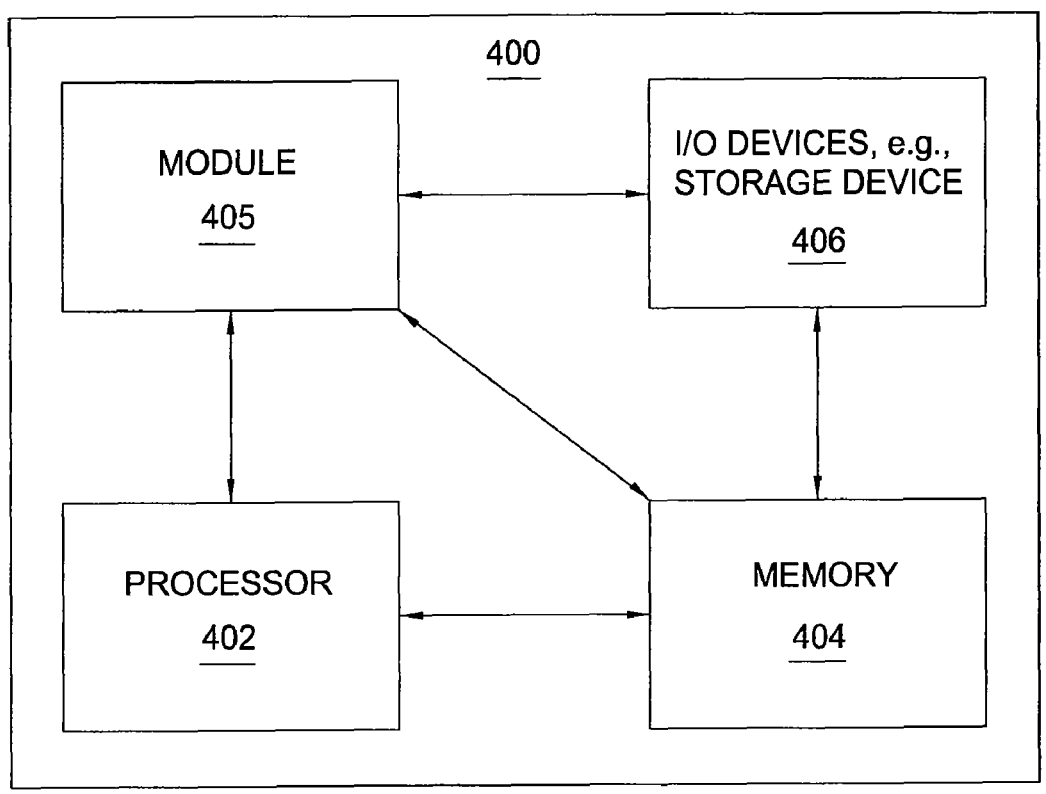
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing automatic processing of a multicast alarm, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing automatic processing of a multicast alarm can be loaded into memory 404 and executed by processor 402 to implement the functions as discussed above. As such, the present method 405 for providing automatic processing of a multicast alarm (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing an alarm, comprising:
   receiving the alarm related to a multicast service;
   retrieving multicast data, wherein the multicast data comprises a source internet protocol address for a source;
   retrieving interface information, wherein the interface information comprises a protocol independent multicast mode;
   retrieving a status of a neighbor of the source in accordance with the source internet protocol address, wherein the neighbor comprises an edge router in communication with the source; and
   determining if the neighbor is established for the source internet protocol address.

2. The method of claim 1, further comprising:
   performing a Layer 1 test and a Layer 2 test if the neighbor is not established.

3. The method of claim 1, further comprising:
   determining if the protocol independent multicast mode is a source specific mode, if the neighbor is established.

4. The method of claim 3, further comprising:
   notifying a work center of a configuration problem, if the protocol independent multicast mode is not the source specific mode.

5. The method of claim 3, further comprising:
   retrieving a reverse path forwarding table if the protocol independent multicast mode is the source specific mode;
   detecting if a reverse path forwarding configuration problem exists; and
   reporting the reverse path forwarding configuration problem to a work center, if the reverse path forwarding configuration problem is detected.

6. The method of claim 5, further comprising:
   retrieving a group address if the reverse path forwarding configuration problem is not detected.

7. The method of claim 6, further comprising:
   determining if there is a connectivity problem between a local provider edge router and the source having the source internet protocol address, wherein the local provider edge router is a router that connects the source to a first access network; and
   notifying the work center of a customer premise problem, if the connectivity problem is determined between the local provider edge router and the source having the source Internet protocol address.

8. The method of claim 7, further comprising:
   determining if there is a connectivity problem between the local provider edge router and a receiver having a receiver internet protocol address, if there is no connectivity problem between the local provider edge router and the source having the source internet protocol address.

9. The method of claim 8, further comprising:
   closing a ticket associated with the alarm automatically if there is no connectivity problem between the local provider edge router and the receiver having the receiver internet protocol address.

10. The method of claim 8, further comprising:
    determining if there is a connectivity problem between a remote provider edge router and the receiver having the receiver internet protocol address, if the connectivity problem is determined between the local provider edge router and the receiver having the receiver internet protocol address, wherein the remote provider edge router is a router that connects the receiver to a second access network;
    notifying the work center of a customer premise problem, if the connectivity problem is determined between the remote provider edge router and the receiver having the receiver internet protocol address; and
    notifying the work center of a network problem, if there is no connectivity problem between the remote provider edge router and the receiver having the receiver internet protocol address.

11. A non-transitory computer-readable medium having stored thereon a plurality of instructions, the plurality of instructions including instructions which, when executed by a processor, cause the processor to perform a method for processing an alarm, comprising:

receiving the alarm related to a multicast service;

retrieving multicast data, wherein the multicast data comprises a source internet protocol address for a source;

retrieving interface information, wherein the interface information comprises a protocol independent multicast mode;

retrieving a status of a neighbor of the source in accordance with the source internet protocol address, wherein the neighbor comprises an edge router associated with the source; and determining if the neighbor is established for the source internet protocol address.

12. The computer-readable medium of claim 11, further comprising:

performing a Layer 1 test and a Layer 2 test if the neighbor is not established.

13. The computer-readable medium of claim 11, further comprising:

determining if the protocol independent multicast mode is a source specific mode, if the neighbor is established.

14. The computer-readable medium of claim 13, further comprising:

notifying a work center of a configuration problem, if the protocol independent multicast mode is not the source specific mode.

15. The computer-readable medium of claim 13, further comprising:

retrieving a reverse path forwarding table if the protocol independent multicast mode is the source specific mode;

detecting if a reverse path forwarding configuration problem exists; and reporting the reverse path forwarding configuration problem to a work center, if the reverse path forwarding configuration problem is detected.

16. The computer-readable medium of claim 15, further comprising:

retrieving a group address if the reverse path forwarding configuration problem is not detected.

17. The computer-readable medium of claim 16, further comprising:

determining if there is a connectivity problem between a local provider edge router and the source having the source internet protocol address, wherein the local provider edge router is a router that connects the source to a first access network; and notifying the work center of a customer premise problem, if the connectivity problem is determined between the local provider edge router and the source having the source internet protocol address.

18. The computer-readable medium of claim 17, further comprising:

determining if there is a connectivity problem between the local provider edge router and a receiver having a receiver internet protocol address, if there is no connectivity problem between the local provider edge router and the source having the source internet protocol address.

19. The computer-readable medium of claim 18, further comprising:

closing a ticket associated with the alarm automatically if there is no connectivity problem between the local provider edge router and the receiver having the receiver internet protocol address.

20. An apparatus for processing an alarm, comprising:

a processor, coupled with a memory, configured to:

receive the alarm related to a multicast service;

retrieve multicast data, wherein the multicast data comprises a source internet protocol address for a source;

retrieve interface information, wherein the interface information comprises a protocol independent multicast mode;

retrieve a status of a neighbor of the source in accordance with the source internet protocol address, wherein the neighbor comprises an edge router associated with the source; and determine if the neighbor is established for the source internet protocol address.

\* \* \* \* \*